Figure 1:
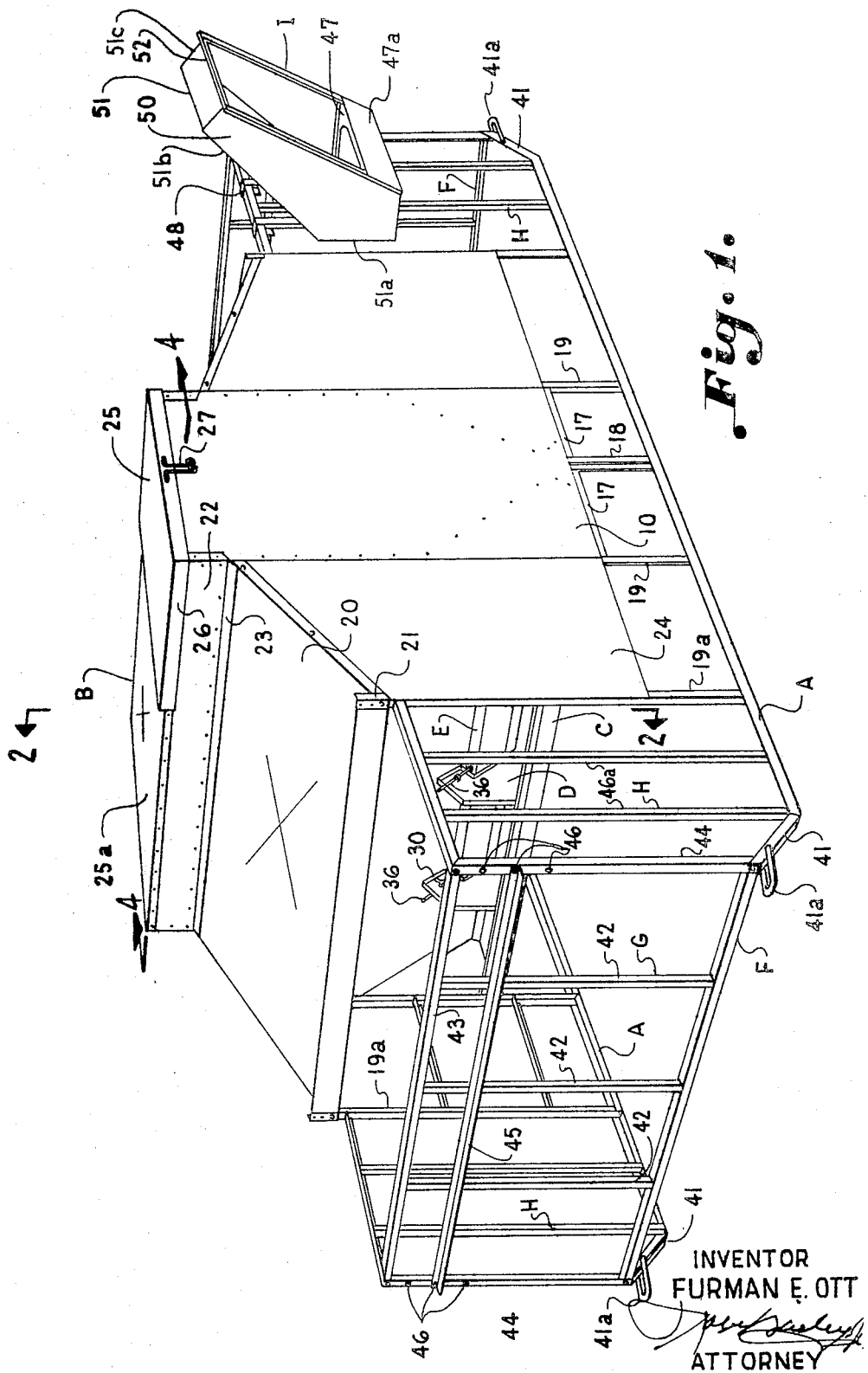

Oct. 15, 1968   F. E. OTT   3,405,684
CREEP FEEDER
Filed July 12, 1965   3 Sheets-Sheet 2

INVENTOR
FURMAN E. OTT
ATTORNEY

Oct. 15, 1968 F. E. OTT 3,405,684
CREEP FEEDER

Filed July 12, 1965 3 Sheets-Sheet 3

INVENTOR
FURMAN E. OTT
ATTORNEY

United States Patent Office 3,405,684
Patented Oct. 15, 1968

3,405,684
CREEP FEEDER
Furman E. Ott, Rte. 3, Laurens, S.C. 29360
Filed July 12, 1965, Ser. No. 471,335
6 Claims. (Cl. 119—53)

This invention relates to animal feeders and more particularly to a creep feeder and associated devices. The invention contemplates a novel feeder for admitting calves but excluding cows.

The entire feeder is carried on longitudinal sleds and an end frame member provides a brace for the sleds as well as forming part of the enclosure. A lower bar of the end frame member is carried on upturned ends of the sleds preferably about eight inches off the ground. This bar has a dual purpose. One purpose is keeping cows out of the enclosure while permitting calves to enter. It has been found that if the height of the openings into the enclosure is such as to permit calves to walk under to reach the feed, cows will get down on their knees and crawl through the opening to the feed, thus interferring with and excluding feeding calves. The bar, being spaced off the ground, will prevent cows from crawling on their knees through the openings but will not prevent calves from stepping over the bar. A second result is to provide a brace for the sleds and frame members.

It has heretofore been necessary to pull creep feeders and the like across the pasture to where the cows are grazing or under trees where they are lying. Such is necessary because the calves will not stray far from the cows, and thus, would not feed unless the feeder is brought to them. This problem has been met by positioning a mineral feeder on the exterior of the device to attract the cows. The cows will come and lick salt in the mineral feeder and during this time the calves will feed from the feeder.

Some creep feeders are large enough to feed six calves at a time but usually such are too large to be pulled through pasture gates, or to be placed on conventional size trailers. In order to avoid the above difficulties creep feeders have been designed having frames, which enclose the feeding troughs, that can be folded up about the hopper when the feeder is being transported. After the feeder is transported to its desired location the frames are unfolded and set up so that animals can feed from it. Usually such feeders must be folded up everytime that they are shifted from one place in a pasture to another.

The subject invention minimizes these problems by providing a feeder portion on longitudinal sleds in which the entire assembly is narrow enough to be pulled through pasture gates and can be transported or pulled about a pasture without disassembling it or folding any frames about the hopper.

In order to control the flow of feed from hoppers to feed troughs, hopper gates or dampers which can be raised and lowered, have been utilized. Some former hopper gates are vertical and perpendicular to a horizontal base. It has been found that in closing such gates feed is trapped between the lower edge of the hopper gate and the base of the hopper making it difficult to close the gates completely. Attempts to eliminate such a problem include hopper gates or dampers positioned at an angle relative to a vertical axis and when closed the cutting edges of the gates are adjacent an inclined base portion. The feed on the lower side of the hopper gate has a tendency to slide down the inclined base portion, therefore, minimizing the trapping of feed between the cutting edge of the gate and the base of the hopper. However, when the gate is inclined at an angle part of the weight of the feed in the hopper must be supported by the gate. Such weight on the gate increases the friction between the gate and braces or supports upon which it slides hampering the opening and closing operation. Furthermore, the gate must be rigid to support the weight of the feed.

The present invention meets these problems by providing a damper with a flange at its lower extremity forming an acute angle therewith. The outer edge of the flange is in contact with an innersurface of a brace and holds the damper away from the innersurface of the brace. The damper can be closed with relative ease due to the small amount of surface contact between the flange and the brace. Furthermore, the flange makes the damper much more rigid, thus permitting the damper to be constructed of sheet metal. The upper extremity of the damper is bent to form a U-shaped structure which makes the damper rigid as well as providing a portion through which a damper control rod can be attached to the damper. The control rod is part of a structure utilized in adjusting the position of the damper. The damper in the present invention is substantially perpendicular to an inclined base, therefore, trapping of feed between the damper and the base during the closing operation is minimized.

Accordingly, it is an object of the present invention to provide an improved animal feeder from which small animals can feed while excluding larger animals.

It is another object of this invention to provide an animal feeder that has an external feeding trough from which cows can feed while calves feed from the main feeding trough.

Still another object of this invention is to provide an animal feeder having a hopper from which the delivery of feed to the troughs can be regulated easily.

Another important object of this invention is to provide an animal feeder carried on a pair of sleds having upturned ends and a bar bridging the upturned ends providing a brace for the sleds as well as a part of a frame for excluding large animals from the feeder.

Still another important object of this invention is to provide an animal feeder on a pair of sleds which is rugged enough to withstand cows and bulls rubbing thereagainst.

A further object of the invention is to provide braces between troughs and inclined side wall panels of a hopper which act as supports for the troughs and the side wall panels as well as a guide and support for a damper or gate of the hopper.

A still further object of the invention is to provide a sheet metal animal feeder of pleasing appearance and economical construction, suitable for use under all weather conditions, and which will maintain feed in a dry condition.

Another object of the invention is to provide a feeder that is narrow enough to be pulled through pasture gates, yet large enough to feed at least six calves at a time.

Figures 2, 3, 4:
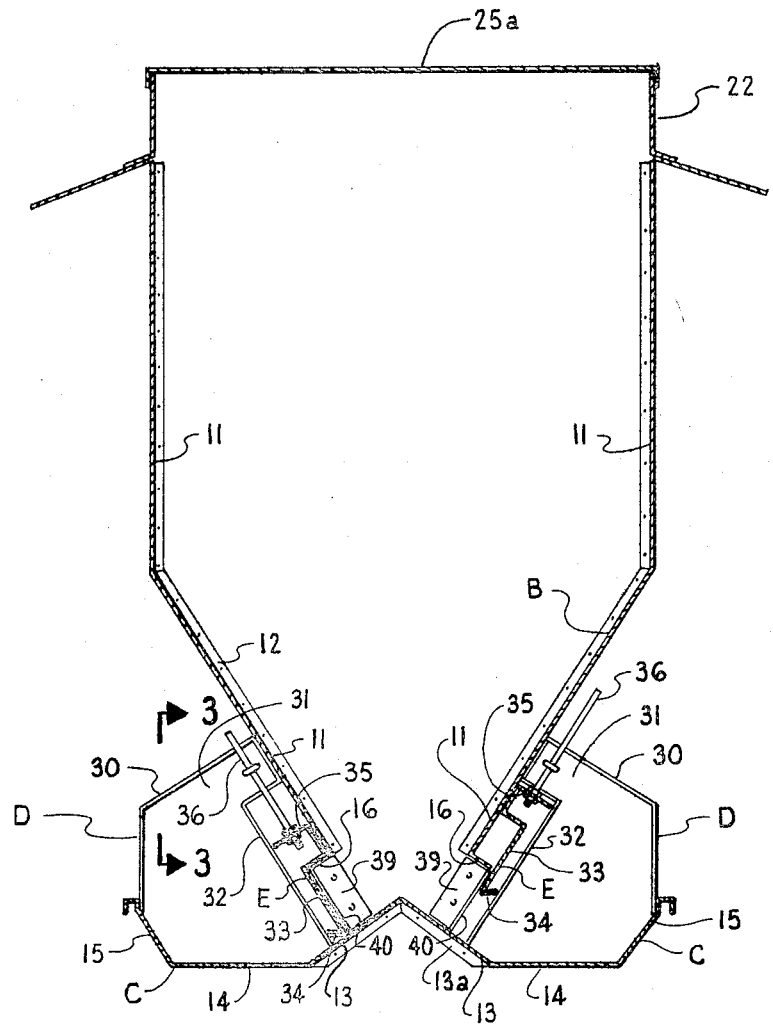
Figure 6:
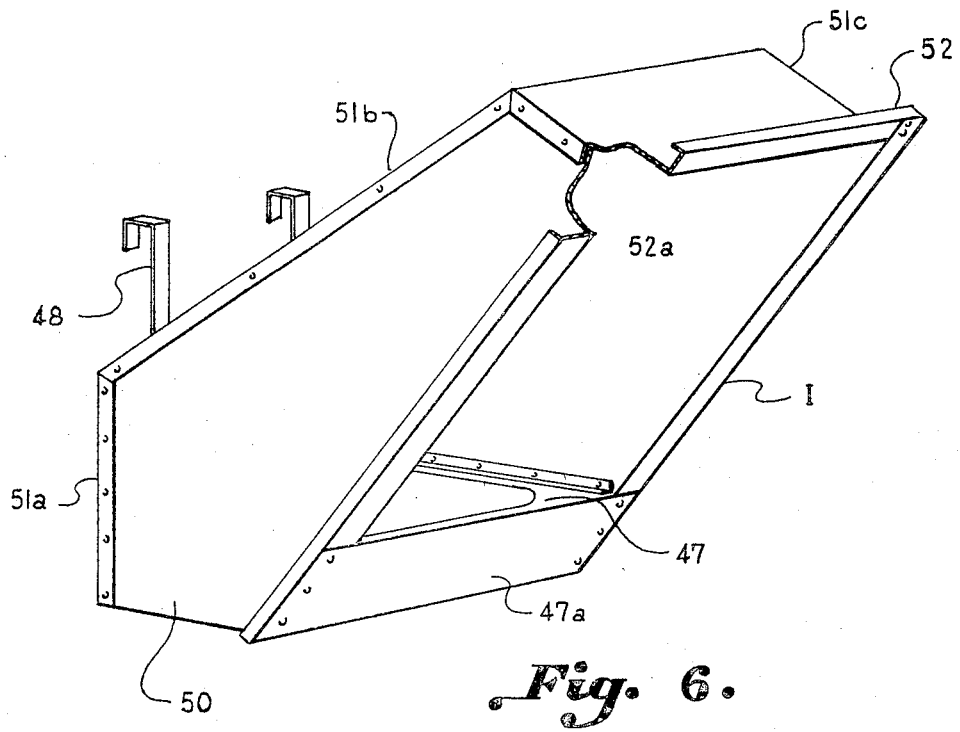
Figure 5:
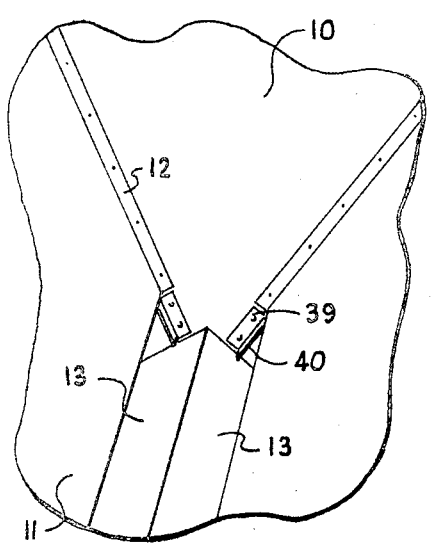
Figure 7:
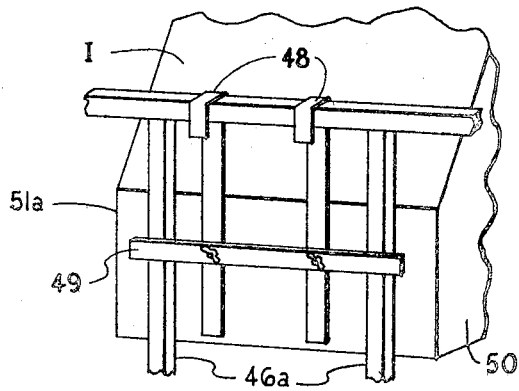

The invention will be more readily understood from a reading of the following specification and by reference to the accompanying drawings forming a part thereof, wherein an example of the invention is shown and wherein:

FIGURE 1 is a perspective view illustrating an animal feeder with a partially enclosed mineral feeder attached on the outside of the frame, constructed in accordance with the present invention, FIGURE 2 is a longitudinal sectional elevation of the hopper taken on the line 2—2 in FIGURE 1, FIGURE 3 is an enlarged fragmentary transverse sectional view taken along line 3—3 of FIGURE 2 showing the devices and method for adjusting the position of the hopper feed gate, FIGURE 4 is an enlarged transverse sectional view taken on the line 4—4 of FIGURE 1, illustrating the top of the hopper, FIGURE 5 is a fragmentary perspective view illustrating the inside of the hopper, FIGURE 6 is a perspective view illustrating the mineral feeder which attaches to the outer frame of the animal feeder, and FIGURE 7 is a rear perspective view of the mineral feeder illustrating the method of attaching such to the frame of the main feeder.

The drawings illustrate a creep feeder for calves including, spaced longitudinal skids A having an upturned portion on the ends of each of the skids. A transversely disposed feed dispensing hopper B is carried by the skids. Feed troughs C are carried on both sides of the hopper and extend transversely to the skids for receiving feed from the hopper. The troughs C have braces D therein which provide support for the troughs and inclined side panels of the hopper. The braces D, also, provide guide means for dampers or gates E, which are used to open and close the openings between the hopper and the troughs. A bar F extends between the free ends of the upturned portions of the skids. A first frame G is carried above said bar having spaces therein sufficient to prevent passage of cows therethrough while permitting passage of calves therethrough. A second frame H, which comprises two side frame members, extends from the first frame in substantial alignment with the skids to the hopper forming an enclosure for calves while they are feeding from the hopper. The bar F serves as a brace for the upturned portions of the skids and prevents passage of cows into the enclosures. The width of the feeder is such as to allow passage through pasture gates while affording adequate room for feeding calves. The length must be sufficient to accommodate the calves and prevent a cow from placing his head through the frame to eat the calves' feed. Mineral feeder I is carried on the second frame H outside of the enclosure. The mineral feeder has a trough therein in which salt and the like is carried for attracting animals to the feeder. Thus, when the creep feeder is being used for calves the salt in the exterior housing attracts cows to the feeder giving the calves that follow the cows an opportunity to eat feed from the creep feeder.

Disposed transversely on the spaced longitudinal skids A is a feed dispensing hopper B. The hopper is shown as being generally rectangular in shape embodying rectangular end walls 10 and inclined side panels 11. The side panels are inclined upward for a distance and then extend straight upwardly forming with the end walls, a rectangular upper portion. The edges of the side panels adjacent the end walls are bent at right angles providing a portion 12 through which brads are placed attaching the side panels to the end walls.

The hopper has a base comprising an intermediate portion 13 of inverted V-shaped configuration. On each side of the V-shaped portion there extends a horizontal portion 14 which terminates in an upturned portion 15 to form a pair of feed troughs C. Between V-shaped portion 13 and the lower edges 16 of the inclined side panels there are openings through which feed flows from the hopper to the troughs. The edges 13a of the base adjacent the end walls are bent at right angles, providing a portion through which brads are placed attaching the base member to the end walls. The horizontal portions 14 of the trough are bolted to and supported by horizontal angle irons 17. Angle irons 17 are bolted between vertical angle irons 18 and 19. Angle iron 19 extends upwardly to a point where rain cover 20 joins the side panel 11. The vertical portion of side panel 11 is bolted to the vertical angle iron 19 to provide support for the hopper. A rain cover 20 extends downwardly from side panel 11 protecting the feed trough from the elements. The outer edge of the rain cover is turned up to provide a gutter 21. The rain cover assembly is supported by an angle iron, not shown, extending down from the top of angle iron 19 to an angle iron 19a.

A vertical side panel 22 is mounted adjacent the top of the hopper and its lower edge 23 laps over rain cover 20 preventing water from seeping between the joint where the rain cover meets the vertical side panel. Vertical wing panels 24 extend downward from the rain cover partially enclosing the troughs.

The top of the hopper is closed with a metal sheet 25a and a door 25 is provided for permitting feed to be placed into the hopper. The door, when closed, has edges 26 which extend down beyond the vertical sides and ends of the hopper as illustrated in FIGURES 1 and 5. The front of the door has a latch 27 for fastening the door. The other end of the door has a down-turned flange 28 which terminates in a horizontal flange 29 extending toward the front on the hopper, see FIGURE 4. The horizontal flange 29 mates with an upturned flange 29a having an outwardly extending edge, which prevents water from running over the top of the hopper and under the door 25 when the door is closed. To open the door the front thereof is lifted and the door is pushed back onto the top of the hopper as shown in dotted lines in FIGURE 4. The downwardly extending edges 26 act as guides when the door is being pushed back.

The troughs C have braces D therein which provide support for the troughs and inclined side panels 11 of the hopper. The braces are constructed of sheet metal as is the rest of the hopper save the angle irons. The braces have a horizontal flange 30 extending about their entire perimeter as illustrated in FIGURES 1, 2 and 3. The flange 30 makes the brace more rigid and it provides a portion through which brads are placed attaching the brace to the trough. The braces each have an upper portion 31 connecting the trough to the inclined side panel 11. An inner surface 32 of the brace projects downwardly from the upper portion 31 and is parallel to inclined side wall 11. The bottom of the inner surface 32 is adjacent the V-shaped base portion 13 and a space is provided between the inner surface 32 and the inclined side wall 11 for positioning the gate E. The contour of the lower portion of the brace is the complement of that of the trough 14.

The adjustable damper E is positioned in the space between the inclined side panel 11 and the inner surface 32 of the brace for controlling the flow of feed from the hopper to the troughs. The damper has a flat main body portion 33 which is substantially perpendicular to the inclined base portion 13. A flange 34 is connected to the lower edge of the main body portion forming an acute angle therewith. The outer edge of the flange 34 is in contact with the inner surface 32 of the brace and holds the lower end of the main body portion away from the inner surface of the brace. The damper can be closed with relative ease due to the small amount of surface contact between the flange 34 and inner surface 32. Flange 34 also makes the damper more rigid, thus such can be constructed of sheet metal and is rigid enough to support part of the weight of the feed. In closing the damper the apex of flange 34 cuts through the feed. Since the damper is substantially perpendicular to the inclined base portion 13, the feed on the lower side of the damper has a tendency to slide down the inclined base, therefore, minimizing the trapping of feed between the apex of the flange 34 and the base 13 allowing the damper to be closed completely. The upper portion of the damper has an inwardly bent flange extending therefrom, an intermediate flange connected with a free end of said inwardly bent flange parallel to the main body portion and an outwardly extending flange connected with a free end of said intermediate flange and perpendicular to the main body portion providing a U-shaped structure 35 integral with the top of the main body portion 33 of the damper. Such U-shaped structure adds rigidity to the damper.

A damper control rod 36 is attached to the U-shaped structure 35 as by nuts and extends upwardly along side of the upper portion 31 of the brace D. The control rod is threaded through the eye of an eye-bolt 37 which is carried by brace D. The shank of the eye-bolt extends through a hole 37a in the brace and a wing nut 38 is threaded on its end. By screwing the wing nut upon eyebolt 37 the shank of the eye-bolt will be pulled through the hole 37a in brace D drawing the control rod up against flange 30 of the brace thereby locking the control rod in position against flange 30. By adjusting the control rod relative to the brace the damper D can be adjusted between the fully open position and the closed position. The damper on the left-hand side of the hopper, illustrated in FIGURE 2, is in the closed position while the damper on the right-hand side is in the open position. Sheet metal right angle guides 39 are braded to the end walls 10 of the hopper in the opening between the hopper and the troughs. These guides have a laterally extending flange 40 that is parallel with the inclined side panel 11. The flange 40 extends laterally for approximately two inches preventing feed from flowing between the end walls and the damper when the damper is closed. The flange also provides a guide for the end of the damper.

A bar F extends between the free ends 41 of the upturned portions of the skids A. This bar provides a brace for the skids, as well as forming with the first frame G, spaces for the passage of calves. The first frame G comprises vertical square tubes 42 which have their lower ends welded to bar F, and their upper ends welded to an upper horizontal bar 43. Bolted to vertical angle irons 44 between the upper horizontal bar and the bar F is an adjustable horizontal bar 45. The adjustable horizontal bar 45, the vertical square tubes 42, and the bar F define spaces through which calves can pass to feed from the troughs. Bar F is spaced off the ground to prevent cows from getting down on their knees and crawling through the spaces. The height of the spaces is such that calves can step over bar F and gain entrance to the trough yet cows and larger animals are denied entrance to the troughs. The height of bar 45 can be varied by shifting the bar between the spaced aligned holes 46 in the vertical angle irons 44. Thus, by shifting the position of bar 45 the size of animals gaining entrance to the troughs can be controlled.

The end frames G are joined to the sides of the hopper by side frames H which are in alignment with the skids A and the sides of the hopper. The side frame members H include longitudinally spaced vertical angle irons 46a. The distance between the angle irons is such as to prevent animals from gaining entrance to the troughs or putting their heads therebetween. U-shaped tow straps 41a are welded to the upturned portion 41 of the sleds so that a tractor can hook-up to the tow straps and pull the creep feeder.

A mineral feeder I is carried on the outside of second frame H. The housing has a trough 47 therein in which salt and the like is placed to attract cows to the feeder so that calves can feed from the main feeder while the cows lick the salt. The housing I hangs on the outside of frame H by hangers 48 which are bolted to the back side of the housing as illustrated in FIGURES 1, 6 and 7. A cross bar 49 is positioned on the inside of vertical angle irons 47. Bolts extend from the inside of the housing through the hangers 48 and cross bar 49. Nuts are threaded on their ends. When the nuts are tightened against cross bar 49 the housing is drawn flush against the vertical angle irons 47. The housing includes a base portion 47a which supports the trough 47. A vertical rear wall 51a encloses the back of the feeder. A hood 51 is connected to the top of the vertical rear wall and extends outwardly beyond the trough. The hood includes a first flat member 51b having an inner edge connected to an upper surface of the rear wall, extending upwardly at an angle to a point where the outer edge thereof extends laterally beyond the outer edge of the trough. A second flat sheet metal member 51c is connected to the outer edge of the first member 51b and extends downwardly and forwardly. The outer edge of the hood or second member 51c is bent to form a U-shaped gutter 52 to prevent rain from draining into the trough. Side walls 50 are secured to the rear wall 51a and the hood 51 to define an enclosure with an opening in the front. The outer edge of the side walls has a flange forming a U-shaped gutter 52a, which cooperates with the gutter 52, on the hood to avoid exposure of the feed to the elements during normal weather conditions. The contour of the hood and side walls are such that they enclose the trough, which normally carries salt, while permitting cows to insert their heads to lick the salt. The mineral feeder I can be easily removed from frame H when not in use or for transportation.

Due to the particular configuration of the mineral feeder, a minimum amount of sheet metal is used in its construction and the feeder is much more wind resistant than if, for example, such were square. Furthermore, the housing is designed so that a cow can lick salt from the trough without placing his entire head and neck into the feeder. Thus, the possibility of the cow damaging the structure by bumping its head on the top and side of the feeder after licking salt is minimized.

While a preferred embodiment of the invention has been described using specific terms, such description is for illustrative purposes only, and it is to be understood that changes and variations may be made without departing from the spirit or scope of the following claims.

I claim:
1. A creep feeder for calves including, spaced longitudinal skids having an upturned portion on an end of each of the skids; a transversely disposed feed dispensing hopper carried by said skids; a feed trough carried by said hopper also extending transversely of the skids receiving feed from the hopper; a bar extending between the free ends of the upturned portions of said skids; a first frame carried above said bar having spaces therein sufficiently to prevent passage of cows therethrough while permitting passage of calves therethrough, and a second frame extending from said first frame in substantial alignment with said skids to said hopper forming an enclosure for calves while they are feeding from said hoppers, said bar, said second frame and said hopper defining an inner opening permitting the calves to stand on the ground while feeding, whereby said bar serves as a brace for said upturned portions of said skids and prevents passage of cows into the enclosures, whereby the width of the feeder may be minimized while affording adequate room for feeding calves; said hopper further including a base portion connected to the trough; upright end walls attached to said base portion; an inwardly inclined panel carried between said upright end walls in substantially perpendicular relationship to said inclined base portion; a brace carried in said trough having an upper portion connecting said trough to said inclined panel; said brace having an inner surface, the lower end of which is adjacent said inclined base portion and which extends upwardly and outwardly in parallel spaced relation with said inclined panel defining a space therebetween; an adjustable damper positioned in said space between said inclined panel and the innersurface of said brace; said damper having a flat main body portion that is substantially perpendicular to said inclined base portion, a flange connected to the lower portion of said main body portion forming an acute angle therewith, the outer edge of said flange being in contact with the innersurface of said brace holding the lower end of the main body portion away from said inner surface of said brace and adding rigidity to said damper; whereby said damper can be raised and lowered to control the flow of feed into the trough with a minimum amount of friction between the damper and the brace and with a minimum amount of feed being trapped between the damper and the inclined base.

2. An animal feeder having a trough including an inclined base portion; upright end walls attached to said base portion; an inwardly inclined panel carried between said upright end walls in substantially perpendicular relationship to said inclined base portion, said base portion, said upright end walls, and said inclined panel defining a hopper which empties feed into said trough; a flange positioned on said panel and extending outwardly of said hopper; a brace carried in said trough having an upper portion connecting said trough to said inclined panel; a lower leg disposed in substantially parallel spaced relation with said inclined panel defining a space therebetween; a member extending inwardly from the top portion of said leg connecting said upper portion and said leg, said flange and said member being substantially parallel to one another and defining spaced stopping surfaces; an adjustable damper positioned in said first mentioned space; said damper having a flat main body portion that is substantially perpendicular to said inclined base portion, a flange connected to the lower portion of said main body portion forming an acute angle therewith, the outer edge of said flange being in contact with the innersurface of said leg holding the lower end of the main body portion away from said innersurface of said brace and adding rigidity to said damper; said upper portion of the main body of said damper having an inwardly bent flange extending therefrom, an intermediate flange connected with a free end of said inwardly bent flange parallel with said main body portion and an outwardly extending flange connected with a free end of said intermediate flange and perpendicular to said main body portion defining a U-shaped structure integral with the top of said main body portion, said U-shaped structure being positioned between said spaced stopping surfaces for engaging the same to limit the opening and closing movement of said main body with respect to said inclined base portion.

3. The device as set forth in claim 2 further including a control rod connected to the U-shaped structure adjacent the top of said main body portion of said damper and extending upwardly therefrom adjacent the upper portion of said brace, means carried by the upper portion of said brace for fixing the damper control rod adjacent the upper portion of said brace whereby the position of the damper may be controlled by adjusting the control rod relative to the upper portion of said brace.

4. The device as set forth in claim 3, wherein said brace has a flange adjacent to which said last-mentioned means maintains said damper control rod for adjusting the position of said damper.

5. A rigid, unitary creep feeder for calves including, spaced longitudinal skids having an upturned portion on each end of the skids; a transverely disposed feed dispensing hopper carried by said skids; a feed trough means carried by said hopper also extending transversely of the skids receiving feed from the hopper; a bracing bar extending between the free ends of the upturned portions of said skids; a first frame disposed above said bar and utilizing said bar as the lower horizontal bar thereof, a second horizontal bar spaced above said lower bar and interconnected thereto by spaced vertical bars which define openings therein of a size to permit passage of certain sized animals, and second frames extending from said first frame in substantial alignment with said skids to said hopper forming a totally opening enclosure permitting said certain sized animals to stand on the ground while feeding from said trough, whereby said bar serves as a brace for said upturned portions of said skids and prevents passages of cows into the enclosures, and whereby the width of the feeder may be minimized while affording adequate room for feeding said certain sized animals, said hopper further including a base portion connected to the trough; upright end walls attached to said base portion; an inwardly inclined panel carried between said upright end walls in substantially perpendicular relationship to said inclined base portion; a flange positioned on said panel and extending outwardly of said hupper; a brace carried in said trough having an upper portion connecting said trough to said inclined panel; a lower leg disposed in substantially parallel spaced relation with said inclined panel defining a space therebetween; a member extending inwardly from the top portion of said leg connecting said upper portion and said leg, said flange and said member being substantially parallel to one another and defining spaced stopping surfaces; and adjustable damper position in said first mentioned space; said damper having a flat main body portion that is substantially perpendicular to said inclined base portion, a flange connected to the lower portion of said main body portion forming an acute angle therewith, the outer edge of said flange being contact with the inner surface of said leg holding the lower end of the main body portion away from said inner surface of said brace and adding rigdity to said damper; and means on said flat main body portion positioned between said spaced topping surfaces for raising and lowering the main portion with the limits defined thereby; whereby said damper can be raised and lowered to contol the flow of feed into the trough with a minimum amount of friction between the damper and the brace and withh a minimum amount of feed being trapped between the damper and the inclined base.

6. The feeder as set forth in claim 5 wherein the last recited means comprises an inwardly bent flange extending from the main body, an intermediate flange connected with a free end of said inwardly bent flange parallel with said main body portion and an outwardly extending flange connected with a free end of said intermediate flange and perpendicular to said main body portion providing a U-shaped structure integral with the top of said main body portion.

References Cited
UNITED STATES PATENTS

| | | | |
|---|---|---|---|
| 608,863 | 8/1898 | Innis | 119—53 |
| 1,121,502 | 12/1914 | Hornbeck | 119—51 |
| 2,362,078 | 11/1944 | Lee | 119—53 |
| 2,863,419 | 12/1958 | Murrell | 119—20 |
| 2,933,062 | 4/1960 | Geerlings | 119—52 |
| 2,959,154 | 11/1960 | Adams | 119—52 |
| 840,003 | 1/1907 | Lineweaver | 119—53 |
| 1,827,075 | 10/1931 | Doane | 119—53 |
| 2,682,255 | 6/1954 | Kleeman | 119—51 |
| 2,789,532 | 4/1957 | Hoebing | 119—51 |

HUGH R. CHAMBLEE, *Primary Examiner.*